Feb. 18, 1958 — G. C. F. ASKER — 2,823,758
BREATHER DEHUMIDIFIER
Filed Aug. 26, 1955
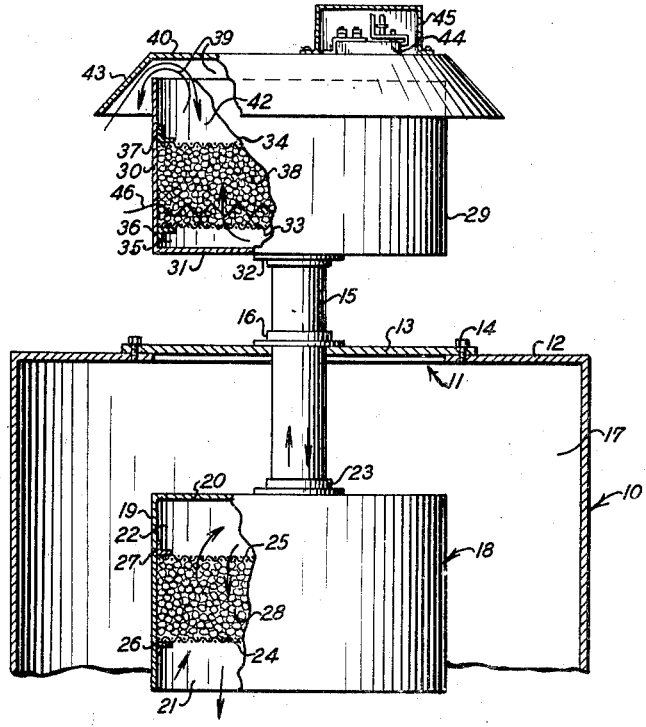
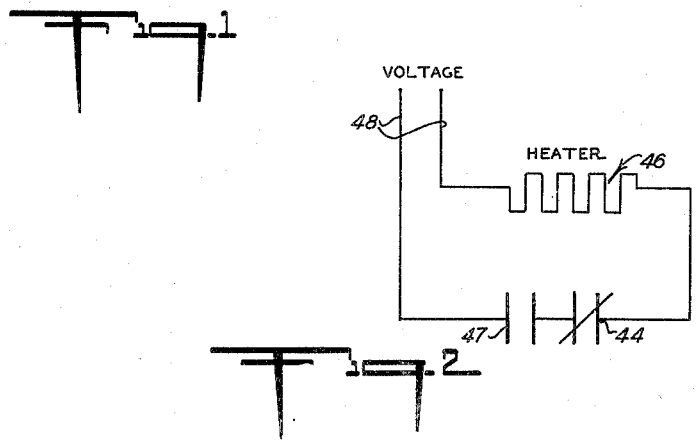
INVENTOR
GUNNAR C. F. ASKER
BY
ATTORNEY

United States Patent Office 2,823,758
Patented Feb. 18, 1958

2,823,758

BREATHER DEHUMIDIFIER

Gunnar C. F. Asker, Washington, D. C., assignor to Desomatic Products, Inc., Falls Church, Va., a corporation of Delaware Application August 26, 1955, Serial No. 530,656

7 Claims. (Cl. 183—4.1)

This invention relates to improved dehumidifier construction, particularly for use as a breather for large storage tanks or chambers which are exposed to varying climatic conditions of temperature and pressure, tending to cause the air in the tank to breathe, to expel a portion of its air content with rising temperature due to the gas expansion, and to draw air back in to the tank by contraction with falling temperature. The present improvement comprises a dehumidifying device cooperating with the breather outlet for maintaining the air in the tank or exposed storage chamber in a dehumidified state.

Large atmospherically exposed storage devices, particularly metal tanks, are commonly used for preservation and storage of materials over substantial periods of time. For optimum preservation of stored materials therein it is desirable that the air within the enclosure be maintained relatively dry. While such large enclosures are usually of metal, they may be of other materials only slightly insulated against substantial temperature variation. The temperature rises during the daytime with the continued exposure to the heat of the sun, and the air within the storage chamber tends to exfiltrate through a vent or breather outlet. As the tank or chamber cools during the nighttime, air infiltrates through the same breather openings. The air which infiltrates is generally humid, and particularly at night, it is relatively more humid than in the daytime. Hence the humidity in the enclosed space tends generally to increase and the air acquires a high moisture content over substantial storage periods, which tends to deteriorate the products stored.

According to the present invention the storage chamber has a dehumidifier mounted for cooperation with, and preferably forming a part of, the breather outlet. The dehumidifier has a bed of desiccant material mounted in a manner such that all of the gas passing into and out of the chamber by way of the breather outlet is constrained to pass through the bed of desiccant material. The gas passing into the chamber through the desiccant bed, accordingly, is dehumidified so that no moist air may enter the storage chamber.

As an improved feature, the dehumidifier construction according to the present invention has an electrical heating device mounted within the desiccant bed which is automatically thermostat controlled to be electrically activated to produce heat for desiccant regeneration and will regenerate the desiccant material. When the ambient temperature outside of the chamber to which the thermostat is continuously exposed begins to rise above a preselected level, the heater becomes activated, and by the rising temperature, simultaneously, the air within the storage chamber begins to expand and pass out of the breather outlet and thence through the heated bed of desiccant material acting as a scavenging gas to remove the moisture from the heated bed of desiccant material and dispose of the moisture laden gas outside of the chamber. That thermostat may have its critical actuating temperature preset manually and generally will be varied seasonally for actuation at the practical temperature at which the ambient temperature outside of the tank begins to rise. For normal weather this corresponds to daylight exposure. For example, for several hours beginning about 11 a. m. rising temperature is significant through about three or four in the afternoon when a maximum is reached or somewhat exceeded and the temperature begins to fall. Over such time period of several hours and where the gas within the chamber for the most part is expanding, the bed will be continuously heated. Before and after this period where the ambient temperature is below the preselected temperature level, the thermostat will have rendered the electrical heater circuit inactive and gas will infiltrate to the chamber and be dehumidified during the drying cycle.

In a preferred embodiment of this invention the desiccant material comprising the dehumidifier is divided into two beds one of which is mounted within the storage chamber for direct contact with the air therein to be dehumidified whereby there is continuous dehumidification of the air within the chamber to keep it dry even removing any moisture that may be evolved from materials stored. A second bed of desiccant material is mounted immediately outside of the chamber. The heating means are mounted only in the second bed for regeneration during the rising temperature periods when the air in the storage chamber is exfiltrated as stated above. Both beds of desiccant are interconnected by a duct for conducting gases serially through both beds whereby each cooperates to effect dehumidification. The bed within the chamber adsorbs moisture statically continuously and that moisture will be continuously redistributed evenly between both beds by diffusion. Thus the inner bed is maintained partially dried by diffusion of its adsorbed moisture, hence it needs no dynamic regeneration.

Moreover, the first inner bed mounted in series with the second outer bed acts as a buffer-like barrier to prevent moisture laden gases evolved by the outer bed during its regeneration from being returned into the desiccant chamber if the pressure therein is reduced.

The entire dehumidification system, merely by variation of atmospheric pressures developed on the air contained within the chamber by ambient temperature variation, operates entirely automatically and without fans or valves, etc. Accordingly, a highly economical and ruggedly reliable and efficient dehumidifier device is made available by the present invention.

A primary object, accordingly, is to provide a completely automatic dehumidifying device, a part of the breather vent, for storage chambers exposed to varying climatic conditions of temperature and pressure whereby the air content tends to flow into and out of such chamber through the dehumidifier hereof.

A further object is to provide means for regeneration of the desiccant material comprising the dehumidifier bed, responsive to external ambient temperatures, when the air within the tank becomes heated by exposure to rising temperature, i. e. sunlight conditions and expands to exfiltrate through the heated bed as a scavenging gas.

A further object of this invention is to provide a dehumidifier having a bed divided into separated but communicating sections, only one of which is heated for regeneration and the other acts as a continuous protective dehumidifying barrier bed and whose moisture content is maintained at a usefully reduced level for dehumidification, by diffusion therefrom into the bed which is dynamically regenerated.

Other objects will be inherent in the description which follows in which—

Fig. 1 is a diagrammatic elevation with parts broken away and in section to illustrate internal construction according to the invention; and Fig. 2 is an electrical wiring diagram illustrating an electrical hook-up for regeneration of one of the beds.

Referring to Fig. 1 a large storage container 10 which may be a metal tank, hutment, or other poorly or uninsulated relatively thin walled torage device, usually disposed out of doors as to be exposed to the elements such as direct sunlight, etc., has its ordinary openings or doors sealed to prevent air exchange. An opening or port 11 is formed near the top of the tank preferably in an upper surface 12, the port 11 being closed by a plate 13 as by bolting with bolts 14 for gas-tight securement over the port 11. The closure plate 13 is centrally bored and has fitted therein a short stub pipe or duct 15 sealed thereto by any suitable sealing collar 16 so that the joint between the duct 15 and supporting plate 13 is gas-tight. The duct 15 will be relatively short and though it may be of any length or diameter, the relationship between the length and diameter is fixed and must be that the length is less than 10 times the diameter in order to allow moisture diffusion freely through its length from one bed to the other.

Secured to the lower end of the duct 15 and disposed entirely within the storage space 17 of the tank 10 is mounted an inner dehumidifier 18. That inner dehumidifier may be of any size or shape sufficient to house a bed of desiccant material 28 proportioned to dehumidify the storage space 17 and volume of air exchanged with the outside with normal temperature variation as will appear. For this purpose, and as shown in Fig. 1, the dehumidifier unit 18 comprises a shell most conveniently having cylindrical walls 19 closed at the top by an annular plate 20 shown integral with the walls 19, the cylindrical walls 19 being open at the bottom 21 for free communication with the air inside the storage space 17.

The duct 15 is fittted to a central bore in the plane 20 for communication with an upper plenum space 22 within the shell 18 and sealed thereto in gas-tight relationship by any conventional sealing collar 23. A pair of vertically separated annular screens 24 and 25 are fastened to the cylindrical walls 19 through brackets 26 and 27 for horizontal mounting, and a bed of granular desiccant material 28 is disposed between the screens 24 and 25 for firm horizontal support. That bed of granular desiccant material 28 may be any usual type of desiccant such as moisture adsorbent silica gel, active alumina, etc., as conventionally used in the art for dehumidification of gases.

Mounted to the upper end of the duct 15 extending outside of the storage tank 10 is a second dehumidifier unit 29 which similarly comprises cylindrical walls 30 of approximately the same diameter as the walls 19 of the inner dehumidifier unit 18. The walls 30 are closed at the bottom by an annular plate 31 which is bored centrally to allow communication with and support upon the upper end of the duct 15 and is sealed thereto by an annular collar 32 for gas-tight seal. A pair of upper annular screens 33 and 34 are mounted horizontally above a lower plenum chamber 35 and supported by annular bracketing to the cylindrical wall 30 at separate vertical positions by brackets 36 and 37. Between the two screens 33 and 34 is disposed a bed of granular desiccant material 38, approximately the same as that of the lower bed 28 in the unit 18. The upper end of the walls 30 of the unit 29 is open to the atmosphere but has several small bracketing ears (not shown) disposed about the upper edge for secure support of a cover member 40 disposed above the walls 30. The cover 40 thereby is spaced from the open top of the walls 30 by space 39 allowing free passage of air into and out of an upper plenum chamber 42 above the screen 34. The plate 40 acts as a shield to prevent rainfall and dust, etc., from entering the cylindrical plenum chamber 42 while allowing free passage of air. The plate 40 further continues into a downturned lip 43 which baffles the air exchange from the outside to the inside of plenum 42 so that the passage of air will be relatively unaffected by air currents, wind, etc.

Mounted at any suitable position on the device conveniently below or above the plate 40 as shown is a thermostat 44 insulated from weathering elements, moisture, etc., by a removable cap or housing 45.

Mounted within the bed 38 is a coil of electrical resistance heater wire 46 of conventional type adapted to supply heat to the bed 38 for regeneration thereof. The heating coil 38 may have a conventional thermostat 47 (Fig. 2) in circuit therewith to control the temperature of the bed to the range of about 300 to 400° F. to prevent overheating. It will be noted that no similar heating coil is mounted in the lower bed 28.

The thermostat 44 is of known construction and is a device sensitive to temperature changes to make and break an electric circuit. That thermostat while shown mounted upon the plate 40 and although it may be disposed in other positions will be preferably mounted in a position for uninsulated response to temperature variations with ambient climatic conditions. That thermostat is adjustable manually to open and close an electric circuit as the temperature rises above or falls below a preselected temperature. The thermostat may conventionally consist of bimetallic elements which vary their position in space with temperature change to make and break an electric contact at or removed from some specific fixed position corresponding to desired temperature. That fixed position for making electrical contact is varied by manual adjustment of a supporting bracket so that the temperature accordingly is varied at will. Since this thermostat is a quite conventional commercial product which may take various forms; no description otherwise is needed. A useful type of thermostat for purposes herein is one available commercially under the trade name "Thermoswitch" manufactured by Fenwall, Inc. of Ashland, Massachusetts and further described by them in detail in a copyrighted brochure in 1952 identified as form No. MC–110.

Referring to the wiring diagram of Fig. 2, the circuit comprises the electrical heater element 46 in series with the thermostat 44, in turn connected to another protective thermostat 47 which is adapted to maintain the temperature produced by the heater element 46 to prevent overheating of the bed 38. The entire circuit is connected to a suitable input voltage across lines 48 which may be any standard current supply of 110–220 volts 60 cycle A. C.

In operation, the device described acts as a breather element for a storage tank which tends to breathe as exposed to climatic variations in temperature whereby the gas within the chamber tends to contract when cooling during the nighttime and thereby draw air into the chamber, and expand and expel the air out through the breather element when heated by exposure to warm sunlight, etc., during the daytime. As described above, the dehumidifier element is associated with and preferably is an integral part of the breather tube. The dehumidifier is controlled by a thermostat 44 exposed to and responsive to temperature variations outside of the storage chamber, which will be set to activate the electrical heating element for regeneration of the bed 38 for at least a portion of the cycle when air is being evolved from the storage chamber 17 while the temperature therein is rising by exposure to rising daytime temperature. The thermostat could be set for activation of the bed over the entire period when gas from the chamber is being evolved, although that extreme is not necessary. For instance, in an ordinary day as the temperature begins to rise in the summer the range of temperature during the daytime may be 70° to 100° F. due to exposure of hot sun rays. And the thermostat may be set to activate the heater element 46 at any temperature above 70° F. Thus in normal summer weather when the temperature in the chamber 17 generally below 70° at night rises to 70° or above with exposure to sunlight, then the heater element 46 becomes activated by the thermostat. Simultaneously expanding gas passes outward from the chamber space 17, first through bed 28, through duct 15, thence into plenum chamber 35 and through the bed 38 being heated by the electrical coil 46 and picks up moisture evolved therefrom and passes it out of the system by way of plenum 42, passageway 39, diverted downward by lip 43 to the atmosphere. The heater element will stay active at any temperature above 70° F. corresponding with the temperature range set by the thermostat. As the temperature falls when the sun begins to set and the ambient temperature is lowered, the gas in chamber 17 begins to contract and air will pass in reverse from the outside into the plenum 42 and down through the beds 38 and 28, with any contraction of the air in chamber space 17. The temperature may rise, for example to 95° F. and then being to fall. As it falls the gas will begin to infiltrate to the chamber 17 but even though the heating element is still active, the bed 28 will serve to protect the chamber 17 as a buffer so that no moisture may enter. The thermostat will cut out and inactivate the circuit through the heater element 46 when the temperature passes below the lower limit of the set temperature of 70° F. of this example. Thus any air that may have passed into the chamber space 17 while the gas in chamber 17 is in process of contracting and while the heater element is still activated will be dried in the buffer chamber bed 28 before passing into the chamber 17 so that the dehumidifier unit 18 acts as a protective unit to dry the gas passing through the breather tube in either direction, whether or not the heater element is active. During the nighttime as the gas in chamber 17 continues to contract the drying of gas infiltrating through the breather device will be dried in both dehumidifier units 18 and 29 before passing into the chamber 17. For variations in temperature in season, for instance, on wintry days where the optimum temperature when the sun is shining which may be desirably in the range of 30° to 50° F., lower or higher, the thermostat will be readjusted to activate the heating element in that temperature range. Thus by mere variation in temperature and without valve control the dehumidifier construction hereof will continuously maintain the gas in the chamber 17 dry.

As noted above the unit 18 within the chamber operates as a buffering element to prevent any return of moisture laden air to the chamber when the heater element is active and when there is any tendency for the flow to reverse with that heater element 46 activated. But the bed 28 is openly exposed to air in the chamber 17 at all times and thereby will tend to maintain the air therein continuously dehumidified by static dehumidification since that bed 28 is open at the bottom 21 for continued exposure thereto. This will allow abstraction of moisture that may have passed into the chamber 17 from any source. For instance articles stored in the chamber 17 initially may have some moisture associated with their bodies and will be continuously dried by the bed 28 in a static dehumidification independently of air circulation by breathing.

The two dehumidifier units 18 and 29 interconnected by the short duct 15 will allow moisture to be continuously redistributed between the beds 28 and 38 by diffusion. This is possible because the duct 15 is dimensioned to be less than ten times its diameter. Since the moisture from bed 28 is continuously abstracted by that diffusion and passes upward through the duct 28 to be abstracted in the bed 38, the moisture of bed 28 tends continuously to be redistributed by diffusion, hence there is no need for regeneration of bed 28 since its moisture content will substantially always be in an equilibrium condition set up by that continuous moisture redistribution and the bed 28 therefore will always be capable of absorbing a further quantity of moisture during breathing.

In normal operation the greater quantity of moisture is absorbed from gas infiltrating from the outside during breathing and that gas will be substantially dried in the upper bed 38 before reaching the bed 28. Accordingly, the overall function of the bed 28 is twofold, to act as a buffering element upon the bed 38 against any gas passing downwardly therethrough while its heater element is active and to effect a further dehumidification statically within the chamber 17 of moisture initially present therein.

Certain modifications will occur to those skilled in the art. It would be possible for instance to add a second heater element to the bed 28 with an independently operated circuit for drying thereof by completely removing the breather element together with plate 13 from the system and drying that unit outside of the system but this by the present construction is not necessary. It is accordingly intended that the above description be regarded as illustrative and not limiting except as defined in the claims appended hereto.

I claim:

1. Means for controlling the vapor content of gases within a storage chamber exposed to climatic variation in temperature and gas pressure within said chamber whereby the gas within that chamber tends periodically to expand and contract with temperature variation, said means comprising a breather element through which gas passing into and out of said storage chamber by pressure variation with temperature is constrained to pass, said element comprising a vapor adsorbent bed, electrical heating element means for heating said bed to expel adsorbed vapors therefrom and thermostatic means exposed to ambient temperature variations and responsive to a selected ambient temperature for activating said electrical heating element in a temperature range in which gas and vapors in said storage tank are expanding and exfiltrating through said vapor adsorbent material whereby the vapors evolved by heat are removed by said gases passing therethrough and passed to the outside of said system.

2. Means for maintaining the gaseous content of a vented storage chamber, which is exposed to climatic variation in atmospheric temperature and pressure, in a dehumidified state, said means being adapted to be mounted as a breather element communicating with the vent in said storage chamber through which the gases within said chamber are constrained to pass expanding and contracting with climatic variations in temperature and pressure, said means comprising an atmospherically open housing having a bed of moisture adsorbent material mounted therein whereby gases moving into and out of said storage chamber from and to the atmosphere pass through said bed, electrical heating element means for heating said bed for regeneration thereof, and thermostatic means responsive to the relatively high temperature portion of a daily climatic temperature cycle for activating said heater element whereby gases, tending to exfiltrate from said storage chamber to the atmosphere during said high temperature portion of the cycle, pass through said moisture adsorbent bed while said bed is being heated as a scavenging gas therefor, and gases, infiltrating from the atmosphere to said storage chamber during the relatively lower portion of the temperature cycle when the heating means is inactivated by said temperature responsive means, pass through said moisture adsorbent bed and become dehumidified, and means for preventing vapors evolved during the heating cycle from reentering and mixing with dry gases in said storage chamber.

3. Means for maintaining the gaseous content of a vented storage chamber, which is normally exposed to climatic variation in atmospheric temperature and pressure, in a dehumidified state, said means being adapted to be mounted as a breather element communicating with the vent in said storage chamber through which the gases within said chamber are constrained to pass when expanding and contracting with climatic vibrations in temperature and pressure, said means comprising two housings interconnected by a duct having a length not exceeding ten times its diameter or passage of vented gas serially through one housing chamber and then the other, both housing chambers being open at sides opposite to said interconnecting duct, a bed of desiccant material in each chamber mounted to intercept the flow of gases passed serially through both housings whereby one housing may be mounted within the gas space of the storage chamber to be dehumidified and the other outside of said storage chamber, means for heating the desiccant bed mounted outside of said storage chamber for regeneration of said bed, and means responsive to the relatively high temperature portion of a daily climatic temperature cycle for activating said heater element.

4. A dehumidifier comprising a first bed consisting of desiccant material, a second bed consisting of desiccant material combined with an electrical heating element for regeneration of said second bed, a duct interconnecting both beds for serial passage of gas from one bed to the other, said duct having a length less than 10 times the diameter thereof, and means responsive to the ambient temperature external to the beds for activating said electrical heating element.

5. In a dehumidifier, a first housing enclosing a bed of desiccant material, an electrical heating element mounted in said bed for regeneration thereof, a second dehumidifier housing having a bed of desiccant material mounted therein, a duct interconnecting said housings for passage of gas serially from one housing to the other through both of said desiccant beds, said duct having a length less than ten times its diameter whereby moisture tends to be redistributed by diffusion through said duct from one bed to the other, means for passing all of the gas serially through both beds alternately in opposite directions, electrical circuit means for activating the heating element in the first desiccant bed for regeneration thereof and means in said circuit responsive to a preselected ambient temperature for activating and rendering inactive said circuit and heater element in said bed, said means for passing gas serially through said bed being adapted to pass gas in the direction first through the bed without the heater element and then through the bed with the heater element when said heater element is activated whereby the gas flow acts as a scavenging gas for the heated bed.

6. The combination of a storage chamber, subject to temperature and pressure variation of gas contained within said storage chamber by climatic exposure, with a dehumidifier mounted in a confining wall of said storage chamber as a vent through which gas expanding and contracting with climatic temperature and pressure variations is constrained to pass, said dehumidifier comprising two dehumidifying housings one of which is mounted within said storage chamber and the other outside of said storage chamber, said housings being interconnected by a duct having a length less than ten times its diameter whereby gas vented into and out of said storage chamber passes through both of said housings serially, a bed of desiccant material in each housing through which vented gas passes in movement into and out of said storage chamber, the bed of desiccant material within said storage chamber being exposed to the gas therein for static dehumidification and dynamic dehumidification when gases are vented therethrough, the bed in the housing outside of said storage chamber being exposed to the atmosphere, an electrical heating element in the bed of desiccant material in the housing outside of said chamber and a thermostat adjustable to a preselected ambient temperature in circuit with said electrical heating element.

7. A dehumidifier adapted to be mounted as a vent in a storage chamber exposed to temperature and pressure variations with climatic conditions through which gases pass into and out of said chamber with said variations and become dehumidified, said dehumidifier comprising two housings each having a bed of desiccant material therein one adapted for mounting within the storage chamber to be dehumidified and the other outside thereof, said housings being interconnected by a duct having a length less than ten times its diameter, an electrical heating element mounted in the bed of desiccant material outside of said storage chamber, electrical circuit means for electrically activating said heating element, and means responsive to a preselected ambient temperature outside of chamber in circuit with said heating element for electrically activating the same when said preselected temperature is exceeded.

References Cited in the file of this patent

UNITED STATES PATENTS

| | | |
|---|---|---|
| 2,462,952 | Dunkak | Mar. 1, 1949 |
| 2,621,752 | Riley | Dec. 16, 1952 |
| 2,671,525 | Asker | Mar. 9, 1954 |

U. S. DEPARTMENT OF COMMERCE

PATENT OFFICE

CERTIFICATE OF CORRECTION

Patent No. 2,823,758                         February 18, 1958

Gunnar C. F. Asker

It is hereby certified that error appears in the printed specification of the above numbered patent requiring correction and that the said Letters Patent should read as corrected below.

Column 3, line 4, for "torage" read --storage--; line 34, for "plane" read --plate--; column 5, line 17, for "being" read --begin--; column 7, line 1, for "vibrations" read --variations--; line 4, for "diameter or" read --diameter for--.

Signed and sealed this 8th day of April 1958.

(SEAL)
Attest:
KARL H. AXLINE

Attesting Officer

ROBERT C. WATSON
Commissioner of Patents